United States Patent [19]

Goldman et al.

[11] Patent Number: 4,652,694
[45] Date of Patent: Mar. 24, 1987

[54] INTERMITTENT PULSED CORONA DISCHARGE LIGHTNING ROD

[75] Inventors: Max Goldman; Alice Goldman, both of Gif/Yvette; Stéphane Kuhn, Orgeval; Pierre-Emmanuel Langlois; Gérard Berger, both of Paris, all of France

[73] Assignee: Centre National de la Recherche Scientifique, Paris, France

[21] Appl. No.: 814,844

[22] Filed: Dec. 30, 1985

[30] Foreign Application Priority Data

Jan. 9, 1985 [FR] France .................................. 85 00239

[51] Int. Cl.⁴ .......................................... H02G 13/00
[52] U.S. Cl. .......................................... 174/3; 361/117; 361/231; 361/235
[58] Field of Search ............... 174/2, 3, 4 R; 361/117, 361/137, 222, 231, 235

[56] References Cited

U.S. PATENT DOCUMENTS 4,540,844 9/1985 Sautereau et al. ...................... 174/3

FOREIGN PATENT DOCUMENTS 0060756 9/1982 European Pat. Off. ................. 174/3
0139575 5/1985 European Pat. Off. ................. 174/2
1089440 9/1960 Fed. Rep. of Germany ..... 174/4 R

*Primary Examiner*—Laramie E. Askin
*Attorney, Agent, or Firm*—Fulbright & Jaworski

[57] ABSTRACT

The invention relates to a corona discharge lightning rod comprising a tip which is isolated from the ground and having a base which is connected via discharge means to the ground, said lightning rod being suitable for ionizing the ambient atmosphere at the end of its tip. An electric circuit is provided for periodically reducing the potential of the tip to a value which is too low to maintain corona discharge, thereby producing periodic and intermittent corona discharge pulses. Preferably, the tip is electrically connected to a potential generator such that the potential ($V_0$) applied to the tip is a variable potential in the form of recurrent wave trains, and such that the peak value of the first half cycle of the train having a polarity opposite to the polarity of the ambient atmosphere is greater than the threshold at which the corona effect takes place. This need only occur in the presence of the natural amplification ($V_1$) as produced by the ambient electric field which exists during a thunderstorm.

14 Claims, 8 Drawing Figures

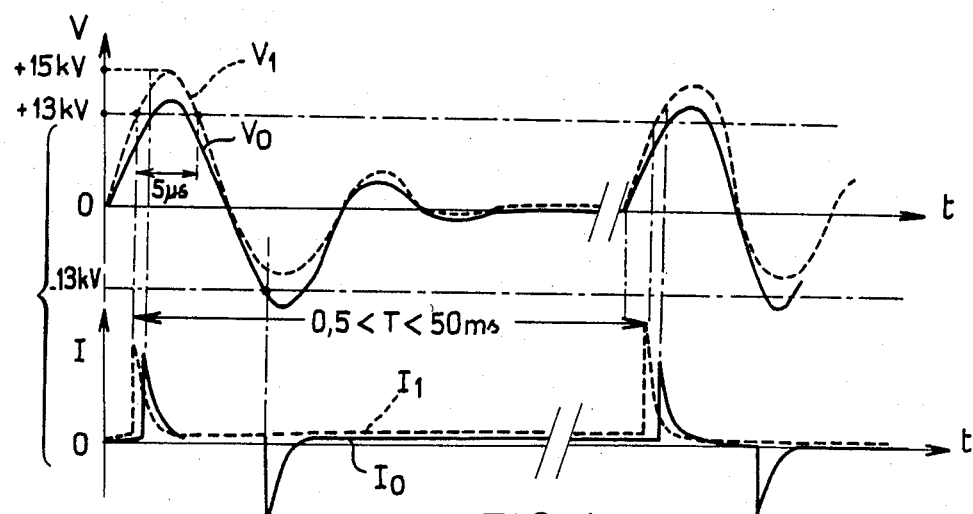
FIG_1
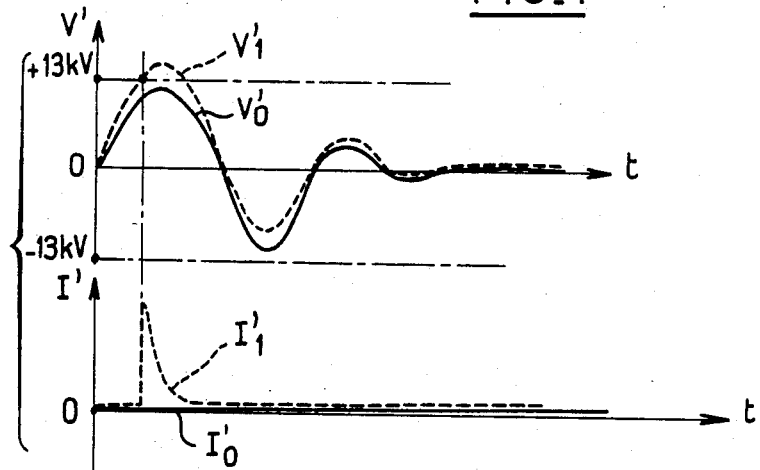
FIG_2
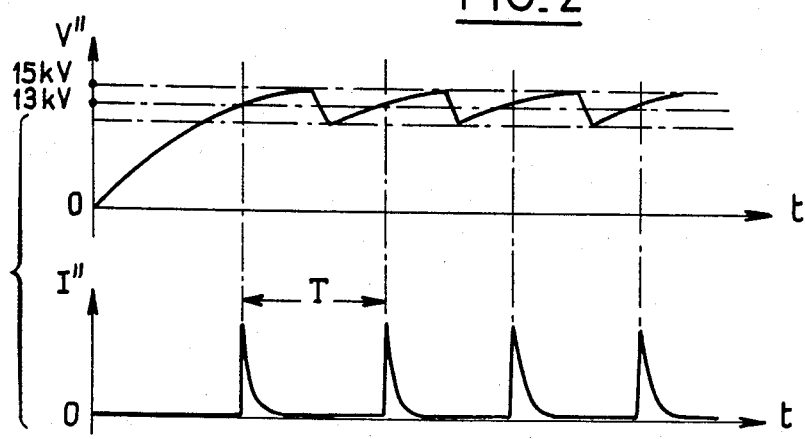
FIG_3

INTERMITTENT PULSED CORONA DISCHARGE LIGHTNING ROD

The present invention relates to a corona discharge lightning rod.

BACKGROUND OF THE INVENTION

European published patent specification EP-A-0,060,756 describes a lightning rod of this type, including a tip which is isolated from the ground, and which has a base connected to the ground via discharger means, said tip is also electrically connected to a generator of a direct positive voltage which is high enough to cause the ambient atmosphere at the end of the tip to be ionized (cornona discharge).

The zone of ionized air plasma formed in this way at the end of the tip has much higher electrical conductivity than ambient air, and thus facilitates lightning discharges towards the lightning rod, thereby improving its efficiency and its radius of action.

However, this increase in conductivity in the vicinity of the lightning rod tip has the effect of locally reducing the electric field, and it thereby inhibits the development of a brush discharge characteristic of a corona discharge from a tip raised to a positive potential, and brush discharge may constitute a favorable element in improving the efficiency of a lightning rod.

Further, the above-described device can only operate with negatively charged clouds (negative type lightning strikes) which corresponds to about 90% of cases in European countries, or even more if mountainous regions are ignored.

SUMMARY OF THE INVENTION

The present invention mitigates the above drawbacks by providing a lightning rod in which the corona discharge is not produced continuously, but is produced intermittently instead, so that each time a discharge occurs, a negligible quantity of residual charge from previous discharges remains in the vicinity of the tip. The potential applied may be of either polarity depending on requirements.

More precisely, the present invention provides a corona discharge lighting rod comprising a tip which is isolated from the ground, the base of said tip being connected to the ground via discharger means, said lightning rod being suitable for ionizing the ambient atmosphere around the end of said tip, said lightning rod further including means suitable for periodically reducing the potential of said tip to a value which is too small to maintain a corona discharge, thereby producing periodic and intermittent corona discharge pulses.

Thus, when a wave or a train of waves is applied to the lightning rod, a pulse of current is produced which is extinguished very rapidly since the potential of the tip returns below the threshold and is insufficient for maintaining the discharge. Such a short term transient phenomenon allows maximum instantaneous currents to be emitted and gives rise to other favorable phenomena ("streamers", seed-electrons, . . . ) ensuring maximum efficiency of the lightning rod.

Advantageously, the recurrence frequency of the intermittent discharges is not less than 20 Hz.

Under such circumstances, it has been observed that the $n^{th}$ brush discharge produced by a positively polarized tip follows the same path through the air as the $(n-1)^{th}$ discharge, and this "channel memory" phenomenon increases with increasing recurrence frequency. This transient phenomenon has been studied, in particular, by E. Berger in articles entitled: "Influence of an electrical discharge on the development of a subsequent discharge in a positive point-to-plane gap" (Second International Conference on Gas Discharges, I.E.E. Publication No 90, London 1972) and "Influence of a Corona discharge on the subsequent one in atmospheric air" (Third International Conference on Gas Discharges, I.E.E. Publication No 118, London 1974) and by G. Hartmann and I. Gallimberti in their article entitled "The influence of metastable molecules on streamer progression" (J. Phys. D., 8, 1975, pp 670–680).

Also advantageously, the intermittent discharge recurrence frequency is not more than 2000 Hz.

It has been observed that at frequencies of more than a few kHz, the increase in lightning rod efficiency falls off and approximates more and more closely to the efficiency of a lightning rod which produces a corona discharge continuously.

Preferably, the period during which the potential of the tip is greater than the threshold voltage at which the corona effect occurs is not less than 1 $\mu$s, and not more than 100 $\mu$s. This range of values makes it substantially certain that a corona discharge will, in fact, be produced and mitigates the random fluctuations in parameters which might otherwise prevent a corona effect from appearing.

Preferably, the peak amplitude of the tip potential is not less than 110% of the threshold voltage at which the corona effect occurs.

By using a voltage which is just above the threshold the transient character of the discharge phenomenon is increased, thereby maximizing the instantaneous current, under all circumstances. (In the following description it is assumed, as is generally the case, that the threshold in question has the same absolute value regardless of its negative or positive polarity. However, should the positive and negative thresholds be substantially different in absolute value, appropriate steps can be taken to adjust the voltages applied to the rod as a function of the real threshold voltages as explained above, and without going beyond the scope of the present invention).

One embodiment consists in electrically connecting the tip to current generator means suitable for producing recurrent waves of electrical current, said waves being discharged into the atmosphere around the tip in such a manner as to produce intermittent corona discharges at the same recurrence frequency.

Another embodiment consists in electrically connecting the tip to potential generator means, such that the potential applied to the tip by the generator means is variable, in the form of recurrent waves or recurrent wave trains, with the absolute value of the peak amplitude of the wave (or in a wave train, of the first half cycle which is of opposite polarity to the ambient atmosphere) being greater than the threshold at which the corona effect is produced. The absolute peak value need exceed the corona discharge threshold only in the presence of the natural amplification which is produced by the ambient electrical field which exists during a thunderstorm.

Alternatively, the lightning rod can be arranged so that the absolute value of the peak amplitude potential applied to the tip by the wave or the first half cycle in a wave train having the opposite plurality to the ambient atmosphere is always greater than the voltage threshold at which the corona effect occurs.

If a train of waves is used, the absolute values of the peak amplitudes of all the subsequent half cycles of the opposite polarity as the cloud are advantageously less than said threshold.

In a particular embodiment, the generator means produce trains of damped alternating waves, and the absolute values of the peak amplitudes of the first two half cycles are greater than the threshold voltage producing the corona effect, so that the corona effect is always produced regardless of the polarity of the ambient atmosphere.

In another particular embodiment, the generator means produce a sawtooth wave or a train of sawtooth waves of positive polarity and without zero crossings.

In particular, the generator means in this case are constituted by an RC or an RLC type circuit which is connected between the tip and a generator of high potential. The resistance R may be constituted by a resistance connected in series between the tip and the generator, and the capacitance C may be constituted by the stray distributed capacitance of the lightning rod between its tip and ground.

The presence of the resistance not only helps to produce the periodic variations in the high tension of the lightning rod tip, but also limits its current consumption and increases the independent endurance of the potential generator. Furthermore, it protects it against lightning strikes by causing the lightning strike current to be discharged via the discharger, and this protective effect increases with increasing resistance.

Further, since the potential of the tip does not pass through zero (it merely has to drop quickly below the extinction threshold of the corona phenomenon), the residual voltage drains ions after the discharge has been extinguished. This means that the recurrence frequency at which the lightning rod operates may be increased in proportion.

BRIEF DESCRIPTION OF THE DRAWINGS

Embodiments of the invention are described by way of example with reference to the accomanying drawings, in which:

FIG. 1 is a waveform diagram showing the variations in voltage and current on the lightning rod, in the case where the rod is subjected to a potential in the form of alternating damped wave trains;

FIG. 2 is a waveform diagram showing a varient of FIG. 1 in the case where use is made of the natural amplification due to the ambient medium;

FIG. 3 is a waveform diagram showing the case where the potential applied to the rod is a sawtooth waveform without zero crossings;

MORE DETAILED DESCRIPTION

Figure 4:
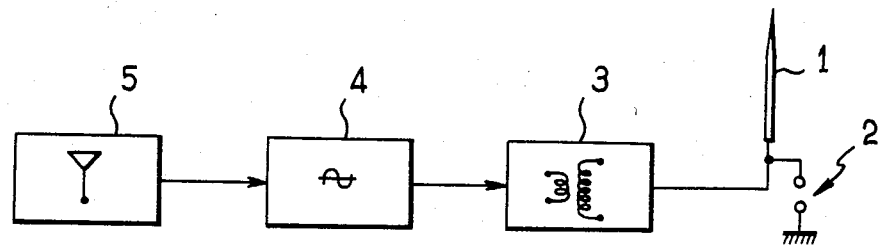
FIGS. 4, 5, and 6 are block diagrams of different circuits for performing the invention.

FIG. 1 relates to an implementation in which the lightning rod is subjected to a variable potential in the form of damped alternating wave trains.

The voltage and current curves correspond to the following parameters:

$V_0$ = the voltage present on the rod in the absence of an ambient electric field (which voltage is therefore equal to the potential supplied to the rod by the generator);

$V_1$ = the potential of the rod taking account of the amplification produced by the ambient electric field which exists during a thunderstorm; this example applies to the case where the cloud is negatively charged; it may be observed that the positive half cycle is amplified whereas the negative half cycle is attenuated;

$I_0$ = the current flowing along the rod (and thus the current discharged into the ambient atmosphere) in the absence of an ambient electric field; it may be observed that each time the absolute value of the potential $V_0$ exceeds the threshold for the appearance of corona discharge (and put as 13 kV, by way of example), a sudden discharge of positive or negative current takes place depending on the potential of the rod; and $I_1$ = the current flowing along the rod when account is taken of the amplification provided by an ambient electric field (due to a negatively charged cloud in this example); it may be observed that the first, positive, pulse is amplified whereas the second pulse which should have been negative is substantially absent, since the peak value of the first negative half cycle is now located below the voltage threshold.

The packets of wave trains are repeated at intervals T lying in the range 0.5 ms to 50 ms, which corresponds to a repetition frequency lying in the range 20 Hz to 2000 Hz.

The peak amplitudes of the first positive half cycle and of the first negative half cycle are chosen in such a manner that, in the absence of any ambient electric field, they exceed the discharge-producing threshold voltage by a very small amount, with the other half cycles in the wave train having amplitudes which always remain below said threshold. Thus, only one effective current pulse is obtained per wave train, with the first negative pulse (in the present example) being extinguished as soon as an ambient electric field appears. The important point that needs to be taken into consideration is to ensure that the interval T between two successive bursts of damped oscillations is long enough to allow the charge which accumulates in the vicinity of the lightning rod to dissipate.

In FIG. 1, the potential $V_1$ of the rod exceeds the voltage at which the corona effect appears during the first positive half cycle for a period of about 5 $\mu$s, with the peak voltage reached being about 15 kV. This very short period ensures that the current pulse retains its transient characteristics, which constitute an important factor in lightning rod performance, as explained above.

FIG. 2 shows a variant of FIG. 1 in which the potential $V_0'$ in the absence of an ambient field is less than that shown in the preceding case (and is thus easier to implement from a technical point of view), and remains below the threshold at which the corona effect appears. The peak value of this potential $V_0'$ is chosen in such a manner that in the presence of an ambient electric field due to a thunderstorm, the resulting potential $V_1'$ exceeds the threshold at which the corona effect appears. A current pulse $I_1'$ is then obtained as in the preceding case. It should be observed that the current $I_0'$ in the absence of an ambient electric field is zero, since a discharge appears only when an ambient electric field is present.

FIG. 3 shows the voltage and current curves applicable to the case where the generator produces a sawtooth voltage waveform, without zero crossings. The peak value of the sawtooth waveform is chosen to have a value (e.g. 15 kV) which is slightly greater than the voltage threshold which triggers the corona effect (13 kV in this example) so as to produce short pulses of current, as in the first example.

Figure 5:
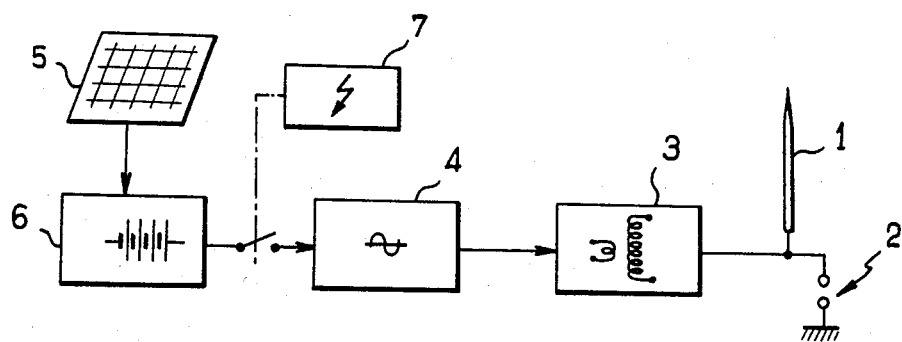
Figure 6:
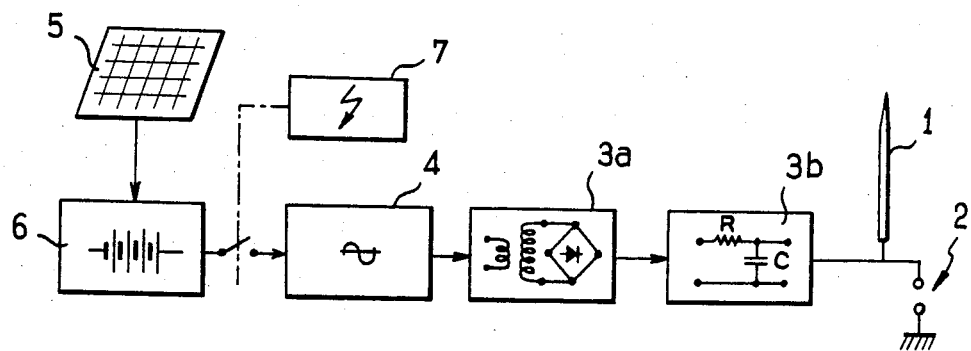

FIGS. 4 to 6 are block diagrams of circuits for performing the invention.

In all three cases, a lightning rod 1 is provided which is isolated from the ground and which is connected thereto via discharger means 2 which may be constituted by purely static means (two metal components separated by an air gap) or which may be constituted by dynamic means operating like a controlled switch.

The lightning rod is connected to high tension generation means 3 which are connected downstream from an oscillator 4 which in turn is powered from an energy source 5.

In FIG. 4, the oscillator 4 is of conventional type and creates signals at the desired recurrence frequency, and the high tension generator 3 is a transformer of the pulse transformer type. The power supply device 5 advantageously draws its energy from the ambient electric field, thereby providing a device which is completely self-contained. In order to do this, use is made of the current which is obtained in a relatively long rod that is immersed in a strong and rapidly increasing electric field as occurs during a thunderstorm. This current is picked-up and transformed by the power supply means 5.

In FIG. 5, the power supply 5 comprises a solar panel charging a storage battery 6 which selectively powers the oscillator 4 via a thunderstorm detector 7 which prevents the system from operating continuously during periods when there is no risk.

FIG. 6 corresponds to an embodiment in which a sawtooth voltage is produced (corresponding to the voltage and current curves shown in FIG. 3). The structure is identical to that shown in FIG. 5 except that the pulse transformer 3 is replaced by an assembly constituted by a high tension transformer and rectifier 3a in order to produce a direct (or at least rectified) voltage which powers an RC circuit 3b which produces the sawtooth waveform for application to the lightning rod.

Figure 7:
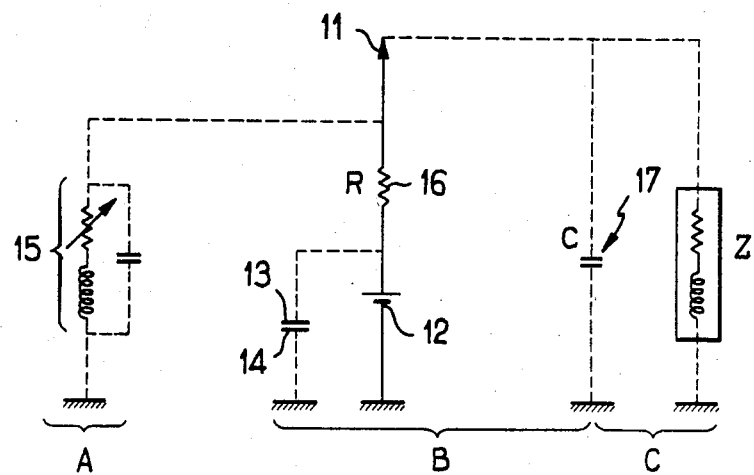
FIGS. 7 and 8 are a circuit diagram and a physical emplacement diagram, respectively, of a particular embodiment in which the lightning rod is subjected to a potential which varies in a sawtooth manner.
Figure 8:
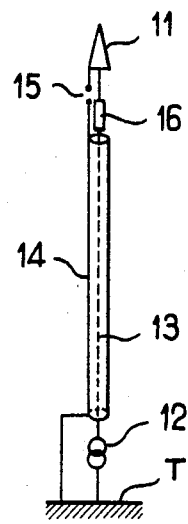

A specific embodiment of the FIG. 6 circuit is illustrated in FIG. 7 (which is an equivalent circuit diagram) and in FIG. 8 (which shows how the components are disposed), and this embodiment is remarkable in that use is made of the distributed capacitance between the lightning rod and ground as a component part of the RC circuit.

More precisely, the lightning rod shown comprises, in conventional manner, a tapering conductive tip 11 and a direct voltage generator 12. The generator is electrically connected between ground T and the tip 11 via a conductive cable 13. The conductor 13 is the core of a coaxial cable whose cladding, i.e. its outer conductive sheath 14, is electrically connected to ground T and via a discharger 15 to the tip 11. The tip and the discharger may be of the type described in the above-mentioned published European patent specification EP-A-0,060,756, for example.

In accordance with the invention, the lightning rod includes a high value resistance, referenced 16, which is connected in series with the conductor 13 between the generator 12 and the tip 11, and it is placed adjacent to the tip.

The equivalent circuit is shown in FIG. 7 and comprises a protective discharger A, the charging circuit B, and the discharging circuit C.

Initially, the tip 11 is connected to the potential generator 12 via the resistance 16 of value R. Once the voltage present on the tip exceeds the threshold value at which the corona effect appears, this circuit is looped to ground via the equivalent impedance Z of the ambient atmosphere. The current then flowing round this current mesh corresponds to the current set up in the vicinity of the tip.

The capacitance of the coaxial cable 13, 14 existing in parallel with the generator is about 50 pF to 100 pF per meter of cable, and it has little effect on the electrical operation of the circuit under steady state conditions.

The discharger 15 is equivalent to a capacitance connected in parallel with a series connection comprising a variable resistance and an inductance. This branch of the circuit is shown using dashed lines in order to recall the fact that it comes into operation only during a lightning strike, whereas the remainder of the circuit operates prior to a lightning strike so as to encourage the lightning to make use of the lightning rod and thereby increase the effective radius of action as effectively as possible.

Finally, reference 17 designates the stray capacitance which exists between the tip and ground (in fact, this "ground" is distributed and the circuit is looped in the atmosphere). The stray capacitance is a few picofarads, for example 5 pF. It may be modified by changing the position of the resistance 16 or by adding an additional capacitance. If the modification increases the stray capacitance, then the energy dissipated in the discharge pulses is increased; whereas if the stray capacitance is reduced, then the voltage at the tip drops off more rapidly as is required for terminating a discharge.

When the generator 12 is put into operation (either manually or automatically) the capacitance C is charged by generator current passing through the resistance R; so long as the threshold at which the corona effect appears has not been reached, the impedance Z may be considered as being quasi-infinite (there is no flux of ionized air). Once the threshold is reached, the capacitance C is suddenly discharged into the impedance Z, thereby briefly ionizing the air in the vicinity of the lightning rod.

It may be observed that this ionization and the current induced thereby along the lightning rod are temporary, since the resistance R is too high to allow current to flow into the impedance Z continuously, as has been the practice in prior art ionizing lightning rods. Here, in contrast, the permanent current passing through the impedance Z in the absence of the relaxation phenomenon has a negligible value relative to the discharge current of the capacitance C. Once the discharge has terminated, the capacitance 17 recharges via R and the cycle repeats in a periodic manner.

The value R of the resistance 16 is advantageously several hundred megohms, e.g. 400 MΩ. The capacitance C is a few picofarads, for example 5 pF.

In this example, the RC time constant of the circuit is $2.10^{-3}$s, giving a pulse frequency of about 500 Hz.

The potential (relative to ground) produced by the generator 12 lies between a few kilovolts and a few tens of kilovolts, and may be as much as a few hundreds of kilovolts. The generator may be of the same type as that used for an ionizing lightning rod producing a permanent discharge.

We claim:

1. A corona discharge lightning rod comprising a tip which is isolated from the ground the base of said tip being connected to the ground via discharger means, said lightning rod being suitable for ionizing the ambient atmosphere around the end of said tip, said lightning rod further including means for producing recurrent cycles of periodically alternated increases and reductions in the potential of said tip to values above and below a level to maintain a corona discharge for producing periodic and intermittent corona discharge pulses.

2. A lightning rod according to claim 1, wherein the recurrence frequency of said intermittent corona discharge pulses is not less than 20 Hz.

3. A lightning rod according to claim 2, wherein the recurrence frequency of said intermittent corona discharge pulses is not more than 2000 Hz.

4. A lightning rod according to claim 1, wherein the period during which the potential at said tip is greater than the threshold voltage producing the corona effect is not less than 1 µs.

5. A lightning rod according to claim 4, wherein the period during which the potential at said tip is greater than the threshold voltage at which the corona effect is produced is not more than 100 µs.

6. A lightning rod according to claim 1, wherein the peak amplitude of the potential at said tip is not less than 110% of the threshold voltage for producing the corona effect.

7. A lightning rod according to claim 1, wherein said tip is electrically connected to current generator means suitable for producing recurrent current waves, said waves being discharged into the atmosphere surrounding said tip in such a manner as to produce intermittent corona discharges at the same recurrence frequency.

8. A lightning rod according to claim 1, wherein said tip is electrically connected to potential generator means, in such a manner that the potential applied to said tip by said generator means is a variable potential in the form of recurrent waves or trains of recurrent waves, and such that the absolute value (optionally taking account of the natural amplification which occurs due to the ambient electric field which exists during a thunderstorm) of the peak amplitude of said waves or of the first half cycle of said train of waves having the opposite polarity to that of the ambient atmosphere is greater than the threshold voltage at which the corona effect is produced.

9. A lightning rod according to claim 8, wherein, regardless of the natural amplification that may be provided by the ambient electric field, the absolute value of the peak amplitude of the said wave or of said first half cycle of opposite polarity to the ambient atmosphere is always greater than the threshold voltage at which the corona effect is produced.

10. A lightning rod according to claim 8, wherein the generator means produce trains of recurrent pulses, and wherein the absolute values of the peak amplitudes of all subsequent half cycles of the same polarity as the cloud after said first half cycle of the same polarity in a train of waves are less than said threshold.

11. A lightning rod according to claim 8, wherein the generator means produce trains of damped alternating waves, and wherein the absolute value of the peak amplitude of the first two half cycles is greater than he threshold voltage at which the corona effect occurs, thereby ensuring that the corona effect always occurs regardless of the polarity of the ambient atmosphere.

12. A lightning rod according to claim 8, wherein the generator means produce a sawtooth or a train of sawteeth of positive polarity and without zero crossings.

13. A lightning rod according to claim 12, wherein the generator means comprise an RC or an RLC type circuit connected between the tip of the lightning rod and a generator of high potential.

14. A lightning rod according to claim 13, wherein the resistance R of said RC or RLC type circuit is a resistance connected in series between the tip and the generator, and wherein the capacitance C thereof is constituted by the distributed stray capacitance of the lightning rod between its tip and ground.

* * * * *

UNITED STATES PATENT OFFICE
CERTIFICATE OF CORRECTION

Patent No. 4,652,694          Dated March 24, 1987

Inventor(s) Max Goldman et al.

It is certified that error appears in the above-identified patent and that said Letters Patent are hereby corrected as shown below:

On front page under title "Foreign Application Priority Data" insert

-- Nov. 29, 1985    European Pat. Off.    85 402358 --.

Signed and Sealed this

Eighth Day of September, 1987

Attest:

DONALD J. QUIGG

*Attesting Officer*    *Commissioner of Patents and Trademarks*